United States Patent
Meijer et al.

(10) Patent No.: US 7,647,580 B2
(45) Date of Patent: Jan. 12, 2010

(54) GENERAL PROGRAMMING LANGUAGE SUPPORT FOR NULLABLE TYPES

(75) Inventors: Henriçus Johannes Maria Meijer, Mercer Island, WA (US); Anders Hejlsberg, Seattle, WA (US); Eric A. Gunnerson, Bellevue, WA (US); Gary S. Katzenberger, Woodinville, WA (US); Peter A. Hallam, Seattle, WA (US); Matthew J. Warren, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 10/935,247

(22) Filed: Sep. 7, 2004

(65) Prior Publication Data

US 2006/0053131 A1 Mar. 9, 2006

(51) Int. Cl.
  *G06F 9/44* (2006.01)
  *G06F 7/00* (2006.01)
  *G06F 17/00* (2006.01)
(52) U.S. Cl. ....................... 717/114; 707/101
(58) Field of Classification Search .................. 717/114
  See application file for complete search history.

(56) References Cited

U.S. PATENT DOCUMENTS

| | | | |
|---|---|---|---|
| 6,272,488 B1 | 8/2001 | Chang et al. | |
| 6,321,374 B1 | 11/2001 | Choy | |
| 6,385,769 B1 | 5/2002 | Lewallen | |
| 6,405,363 B1 | 6/2002 | Carlson et al. | |
| 2004/0194058 A1* | 9/2004 | Meijer et al. | 717/116 |
| 2006/0015528 A1* | 1/2006 | Hejlsberg et al. | 707/104.1 |

OTHER PUBLICATIONS

C# Version 2.0 Specification, Published : May 2004 by Microsoft Corporation, pp. 1-100.*
Meijer et al., Unifying Tables, Objects and Documents published 2003, pp. 1-11.*
M. Hofmann and B.C. Pierce. A Unifying Type-theoretic Framework for Objects. Journal of Functional Programming, Cambridge University Press, 1993. 42 pages.
Jurg Gutknecht. Oberon as an Implementation Language for COM Objects. Microsoft Research, 1998. 22 pages.
G. Bracha, M. Odersky, D. Stoutamire, and P. Wadler. Making the Future Safe for the Past: Adding Genericity to the Java Programming Language. Proceedings of the 13th ACM Sigplan Conference, pp. 183-200, 1998.
U.S. Appl. No. 11/214,583, filed Aug. 29, 2005, Meijer, et al.

* cited by examiner

*Primary Examiner*—Tuan Q Dam
*Assistant Examiner*—Zheng Wei
(74) *Attorney, Agent, or Firm*—Workman Nydegger

(57) ABSTRACT

The subject invention relates to systems and methods that provide null capabilities within the context of programming languages. In one aspect, a system is provided that facilitates null-support in various programming languages. The system includes one or more types associated with at least one programming language. A type modifier is provided to signal that the type is nullable. The type modifier enables a multi-element structure to be automatically created in association with the type wherein, the multi-element structure includes the type and a Boolean element indicating whether or not the variable is null.

20 Claims, 9 Drawing Sheets

US 7,647,580 B2

GENERAL PROGRAMMING LANGUAGE SUPPORT FOR NULLABLE TYPES

TECHNICAL FIELD

The subject invention relates generally to computer systems and more particularly, the subject invention relates to providing nullable type support across multiple variable types in various programming languages.

BACKGROUND OF THE INVENTION

As programming approaches and foundations have evolved, application programming interfaces (APIs) and programming schemas have been developed to standardize and unify programming methodologies that were previously multi-variant and relatively incompatible. Modern programming therefore often involves employing APIs and schemas in conjunction with reusable libraries. Unfortunately, this evolution has inadvertently created many inefficient programming artifacts that are actually spread and perpetuated by these standardizations programming constructs. For example, one resulting software programming artifact is a duality between reference types and value types.

Reference types are variables that are stored on a heap and referenced by a pointer stored on the stack. Value types are variables that are stored directly on the stack. Consequently, variables that are represented as reference types can be uninitialized (termed "null"), but variables that are represented as value types cannot be established in an uninitialized condition without risking indeterminate or even catastrophic results. This nullification issue can present problems in a myriad of situations, including data base accessing.

The nullification problem has been previously addressed with many different strategies. Examples of such strategies include tuples, boxing, variants, convoluted pointer manipulations, and so forth. However, each of these strategies have one or more drawbacks including memory inefficiencies, runtime inefficiencies, loss of strong typing, proliferation of non-standard types, and so forth. By way of example, boxing turns value types into reference types, with the accompanying greater memory usage and increased processing demands to handle the inherent pointer overhead.

Support for nullability across all types, including value types, is essential when interacting with databases, yet general purpose programming languages have historically provided little or no support in this area. Many approaches exist for handling nulls and value types without direct language support, but all have shortcomings. For example, one approach is to use a "special" value (such as −1 for integers) to indicate null, but this only works when an unused value can be identified. Another approach is to maintain boolean null indicators in separate fields or variables, but this doesn't work well for parameters and return values. A third approach is to use a set of user-defined nullable types, but this only works for a closed set of types.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to providing nullable type support across multiple types in programming languages. A type modifier can be applied to a type in substantially any form to automatically create a multi-element structure representing the underlying value of the type along with a Boolean element in the structure representing whether or not the value is null. Null is generally assigned to a value indicating an undetermined or undefined type. The data indication of null (e.g., value of false) can be employed if the underlying value of the variable in the structure is declared or detected null, wherein the variable is then considered null regardless of the actual value of the variable. If the data indication in the Boolean element is non-null (e.g., value of true), the actual value of the nullable type is represented and may be processed in accordance with the actual value. By allowing substantially any type to also include the concept of nullability, the subject invention allows the concept of nullability to be efficiently handled and processed across all programming languages while mitigating conventional workarounds and potential coding problems such as employing "special" values to indicate null, maintaining boolean null indicators in separate fields or variables, and employing user-defined nullable types for a closed set of types.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The subject invention relates to systems and methods that provide null capabilities within the context of programming languages (e.g., C, C++, C#, Pascal, Fortan, BASIC, other dynamic languages and so forth). In one aspect, a system is provided that facilitates null-support in various programming languages. The system includes one or more types associated with at least one programming language. A type modifier is provided to signal that the type is nullable. The type modifier enables a multi-element structure to be automatically created in association with the type wherein, the multi-element structure includes the original value and a Boolean element indicating whether or not the value is null. In this manner, programming languages can be made to seamlessly integrate with other languages such as SQL and XML that commonly support null values.

As used in this application, the terms "component," "type," "modifier," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
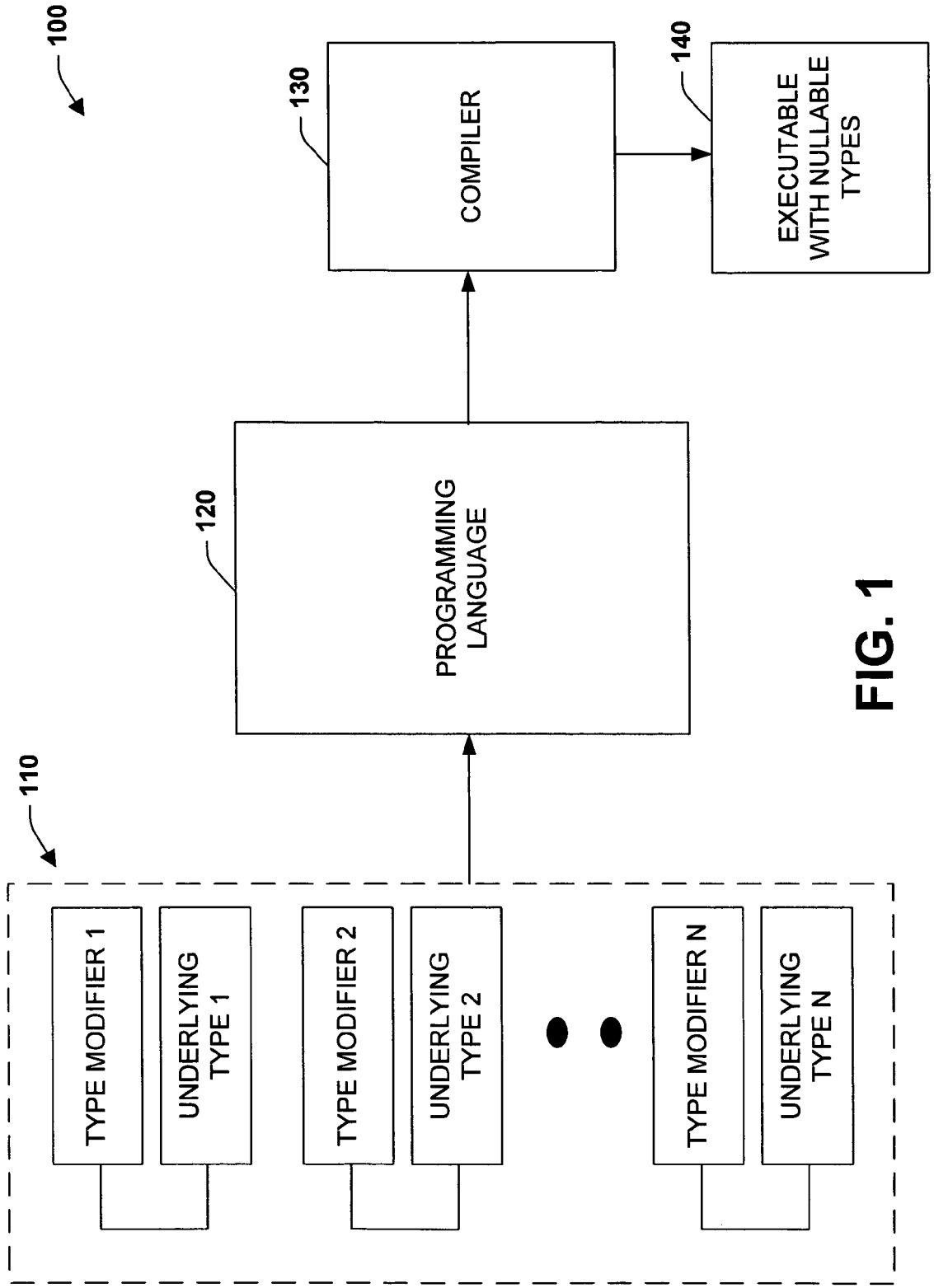
FIG. 1 is a schematic block diagram illustrating a system for providing nullable type support for programming languages in accordance with an aspect of the subject invention.

Referring initially to FIG. 1, a system 100 provides nullable type support for programming languages in accordance with an aspect of the subject invention. The system 100 includes one or more data structures 110 that can be declared in the context of a programming language 120 such as C, C++, C#, Pascal, Python, Ruby, Visual Basic, Java, and so forth. The data structures 110 generally consist of an underlying type such as an integer, float, Boolean, and so forth that can be declared to be a nullable type by associating a type modifier with the underlying type. For instance, a symbol such as "?" can be employed as a type modifier to indicate to a compiler 130 that the underlying type is to be considered a nullable type. It is to be appreciated that various other symbols can be employed as the type modifier. Upon declaration and compilation, executable code can be generated at 140 via the compiler 130 including nullable and non-nullable types, if desired by the programmer. Nullable types can contain any value available for the underlying type and also include the value of null. This is achieved by automatically creating a multi-element structure including an element for the underlying value and a Boolean element representing whether or not the underlying value is null (e.g., flag indicating null or non-null value for the underlying type). If the Boolean element is declared false for example, the underlying type is considered null, whereas if the Boolean element is true for example, the value contained in the underlying value is considered the value of the nullable type variable.

Generally, nullable types are constructed using the ? type modifier (or other symbol). For example, int? is a nullable form of the predefined type int. A nullable type's underlying type should be a non-nullable value type. A nullable type is a structure that combines a value of the underlying type with a boolean null indicator. An instance of a nullable type generally has two public read-only properties that can be used to test the null status of the value: HasValue, of type bool, and Value, of the nullable type's underlying type. For example, HasValue is true for a non-null instance and false for a null instance. When HasValue is true, the Value property returns the contained value. When HasValue is false, an attempt to access the Value property throws an exception.

An implicit conversion can exist from any non-nullable value type to a nullable form of that type. Furthermore, an implicit conversion can exist from the null literal to any nullable type. For example:
    int? x=123;
    int? y=null;
    if (x.HasValue) Console.WriteLine(x.Value);
    if (y.HasValue) Console.WriteLine(y.Value);

In the above examples, the int value 123 and the null literal are implicitly converted to the nullable type int?. The example outputs 123 for x, but the second Console.WriteLine is not executed since y.HasValue is false.

Nullable conversions and lifted conversions described below permit predefined and user-defined conversions that operate on non-nullable value types to also be used with nullable forms of those types. Likewise, lifted operators permit predefined and user-defined operators that work for non-nullable value types to also work for nullable forms of those types. For predefined conversions from a non-nullable value type S to a non-nullable value type T, for example, a predefined nullable conversion automatically exists from S? to T?. This nullable conversion is a null propagating form of the underlying conversion: It converts a null source value directly to a null target value, but otherwise performs the underlying non-nullable conversion. Nullable conversions are furthermore provided from S to T? and from S? to T, the latter as an explicit conversion that throws an exception if the source value is null.

Some examples of nullable conversions are shown in the following.

```
int i = 123;
int? x = i;              // int --> int?
double? y = x;           // int? --> double?
int? z = (int?)y;        // double? --> int?
int j = (int)z;          // int? --> int
```

A user-defined conversion operator has a lifted form when the source and target types are non-nullable value types. A ? modifier is added to the source and target types to create the lifted form. Similar to predefined nullable conversions, lifted conversion operators propagate nulls. A non-comparison operator has a lifted form when the operand types and result type are all non-nullable value types. For non-comparison operators, a ? modifier is added to each operand type and the result type to create the lifted form. For example, the lifted form of a predefined+operator that takes two int operands and returns an int is an operator that takes two int? operands and returns an int?. Similar to lifted conversions, lifted non-comparison operators are null propagating: If either operand of a lifted operator is null, the result is null.

The following example uses a lifted+operator to add two int? values:
    int? x=GetNullableInt( );
    int? y=GetNullableInt( );
    int? z=x+y;

The assignment to z effectively corresponds to:
    int? z=x.HasValue && y.HasValue ? x.Value+y.Value: (int?)null;
    Since an implicit conversion exists from a non-nullable value type to its nullable form, a lifted operator is applicable when one operand is of a nullable type. The following example uses the same lifted+operator as the example above:
    int? x=GetNullableInto;
    int?y=x+1;

If x is null, y is assigned null. Otherwise, y is assigned the value of x plus one.

The null propagating semantics of C#'s nullable conversions (or other language), lifted conversions, and lifted non-comparison operators are very similar to the corresponding conversions and operators in SQL. However, C#'s lifted comparison operators can be designed to produce regular boolean results rather than introducing SQL's three-valued boolean logic, if desired.

A comparison operator (==, !=, <, >, <=, >=) has a lifted form when the operand types are non-nullable value types and the result type is bool. The lifted form of a comparison operator is formed by adding a ? modifier to each operand type (but not to the result type). Lifted forms of the == and != operators consider two null values equal, and a null value unequal to a non-null value. Lifted forms of the <, >, <=, and >= operators return false if one or both operands are null.

When one of the operands of the == or != operator is the null literal, the other operand may be of any nullable type regardless of whether the underlying value type actually declares that operator. In cases where no operator == or != implementation is available, a check of the operand's Has-Value property is substituted. The effect of this rule is that statements such as:
    if (x==null) Console.WriteLine("x is null");
    if (x!=null) Console.WriteLine("x is non-null");
are permitted for an x of any nullable type or reference type, thus providing a common way of performing null checks for all types that can be null.

A new null coalescing operator, ??, can also be provided. The result of a ?? b is a if a is non-null; otherwise, the result is b. Intuitively, b supplies the value to use when a is null. When a is of a nullable type and b is of a non-nullable type, a ?? b returns a non-nullable value, provided suitable implicit conversions exist between the operand types. In the example:
    int? x=GetNullableInt( );
    int? y=GetNullableInt( );
    int? z=x ?? y;
    int i=z?? −1;

The type of x ?? y is int?, but the type of z ?? −1 is int. The latter operation is convenient because it removes the ? from the type and at the same time supplies the default value to use in the null case. The null coalescing operator also works for reference types. The example:
    string s=GetStringValue( );
    Console.WriteLine(s ?? "Unspecified");

Outputs the value of s, or outputs Unspecified if s is null.

Figure 2:
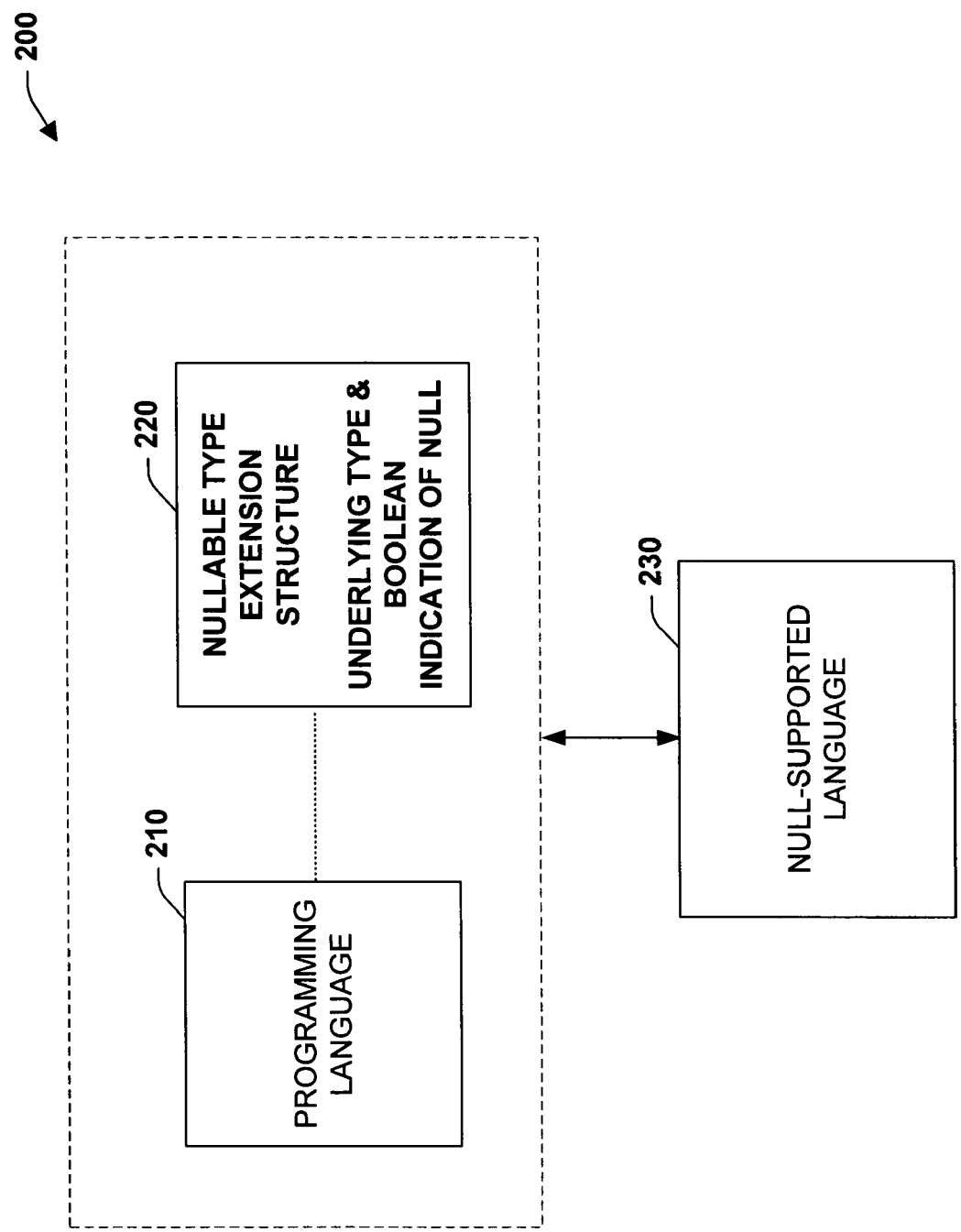
FIG. 2 is a diagram illustrating null compatibility between languages in accordance with an aspect of the subject invention.

Referring now to FIG. 2, a system 200 illustrates null compatibility between languages in accordance with an aspect of the subject invention. In this aspect, a representative programming language is illustrated at 210, wherein the language is adapted for null compatibility with a nullable type extension structure 220. As noted above, such structures 220 include a memory location to hold a value for an underlying type such as an integer or floating point value and include a memory location in the structure for a Boolean value indicating whether or not the underlying type is null. After adapting the programming languages 210 for handling nullable types 220, other null-supported languages 230 can be readily interfaced with. For instance, the null-supported languages can include a database language such as SQL or variants such as SQLXML or XML for example, that may include null in columns or other structures of the language, for example. In one specific example, the database language may be a listing of people having addresses and telephone numbers. If one of the values of the columns were unknown such as a missing address or telephone number, the value of null may be employed to indicate that the actual data is unknown or missing. By providing null-support 220 with the programming language 210, the null-supported languages and programming languages 210 can be integrated (e.g., codes in C# programming languages can read/write and interpret nullable fields in the database language and visa versa).

Figure 3:
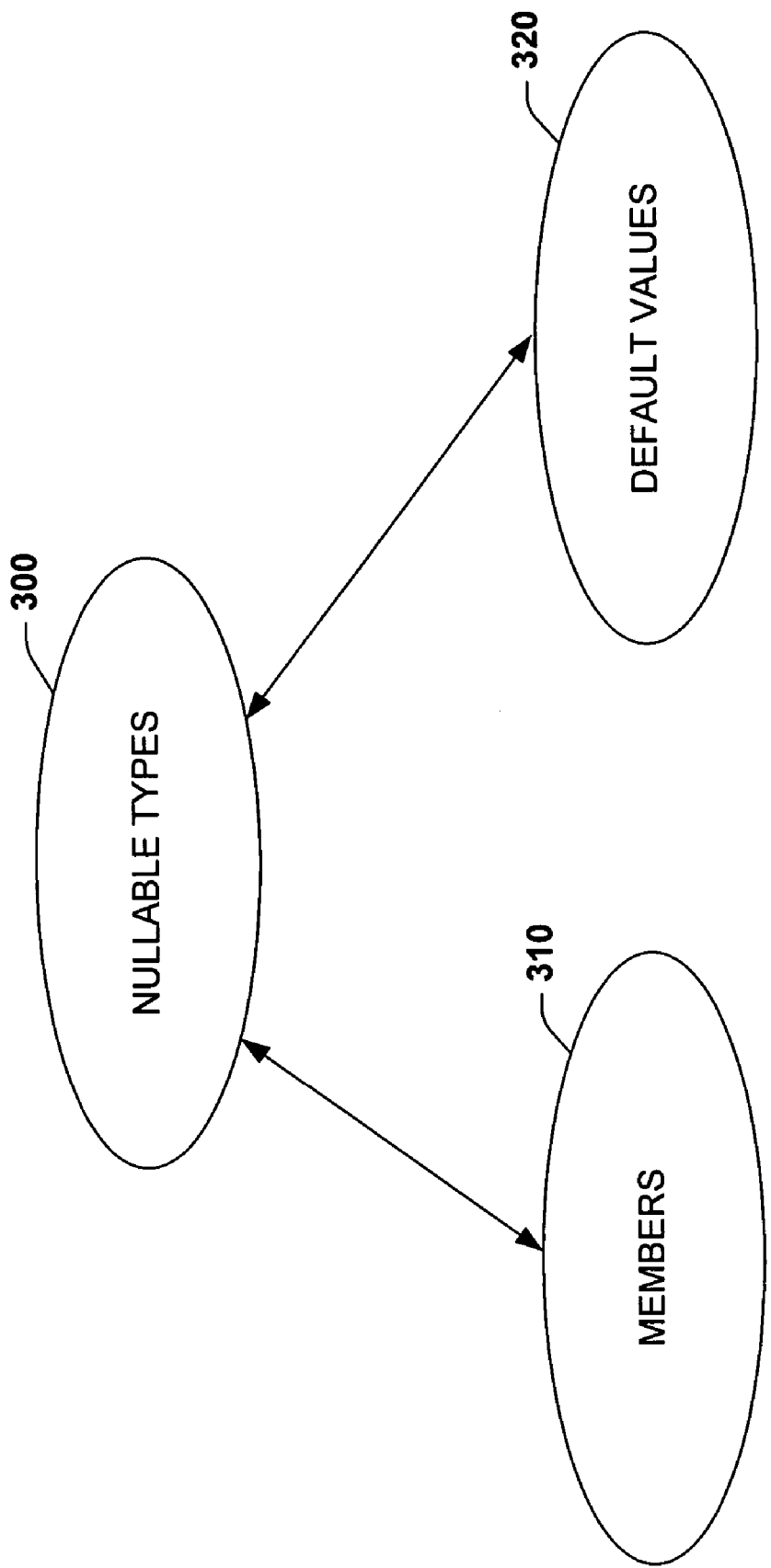
FIG. 3 is a diagram illustrating more detailed aspects of nullable types in accordance with an aspect of the subject invention.

Turning now to FIG. 3, more detailed aspects of nullable types 300 are illustrated in accordance with an aspect of the subject invention. The nullable type 300 is generally classified as a value type such as:

---
value-type:
    struct-type
    enum-type
    nullable-type
nullable-type:
    type ?
---

The type specified before the ? modifier in a nullable type 300 is referred to as the underlying type of the nullable type. The underlying type of a nullable type can be any non-nullable value type (that is, any type parameter with a struct constraint), but it typically cannot be a reference type or a nullable type. For example, int? and double? are valid nullable types, but string? and int?? are generally not. A nullable type can represent all values of its underlying type plus an additional null value. This invention however can be limited to this restriction and the underlying type of the nullable type 300 may itself be a nullable type or a reference type. Thus, types such as int?? and int??? are permitted, although they can represent no more values than int?. The syntax T? is shorthand for System.Nullable<T>, and the two forms can be used interchangeably.

At 310, members of nullable types 300 are considered. An instance of a nullable type T? generally has two public read-only properties:
    A HasValue property of type bool
    A Value property of type T An instance for which HasValue is true is said to be non-null. A non-null instance contains a known value and Value returns that value. An instance for which HasValue is false is said to be null. A null instance has an undefined value. Attempting to read the Value of a null instance can cause a System.InvalidOperationException to be thrown.

In addition to the default constructor, every nullable type T? typically has a public constructor that takes a single argument of type T. If nested nullable types, or nullable reference types are allowed, a constructor invocation of the form—new T?(x) is evaluated as follows: If T is a type parameter, if the run-time type of T is a nullable type, and if x is null, the result is the null value of T?. Otherwise, the result is a non-null instance of T? for which the Value property is x. It is usually not necessary to explicitly invoke a nullable type's constructor since equivalent functionality is provided as an implicit conversion from T to T?.

At 320, default values for nullable types 300 are considered. The default value of a nullable type is an instance for which the HasValue property is false and the Value property is undefined although different default values can be provided, if desired. The default value is also known as the null value of the nullable type. An implicit conversion exists from the null literal to any nullable type, and this conversion produces the null value of the type.

Figure 4:
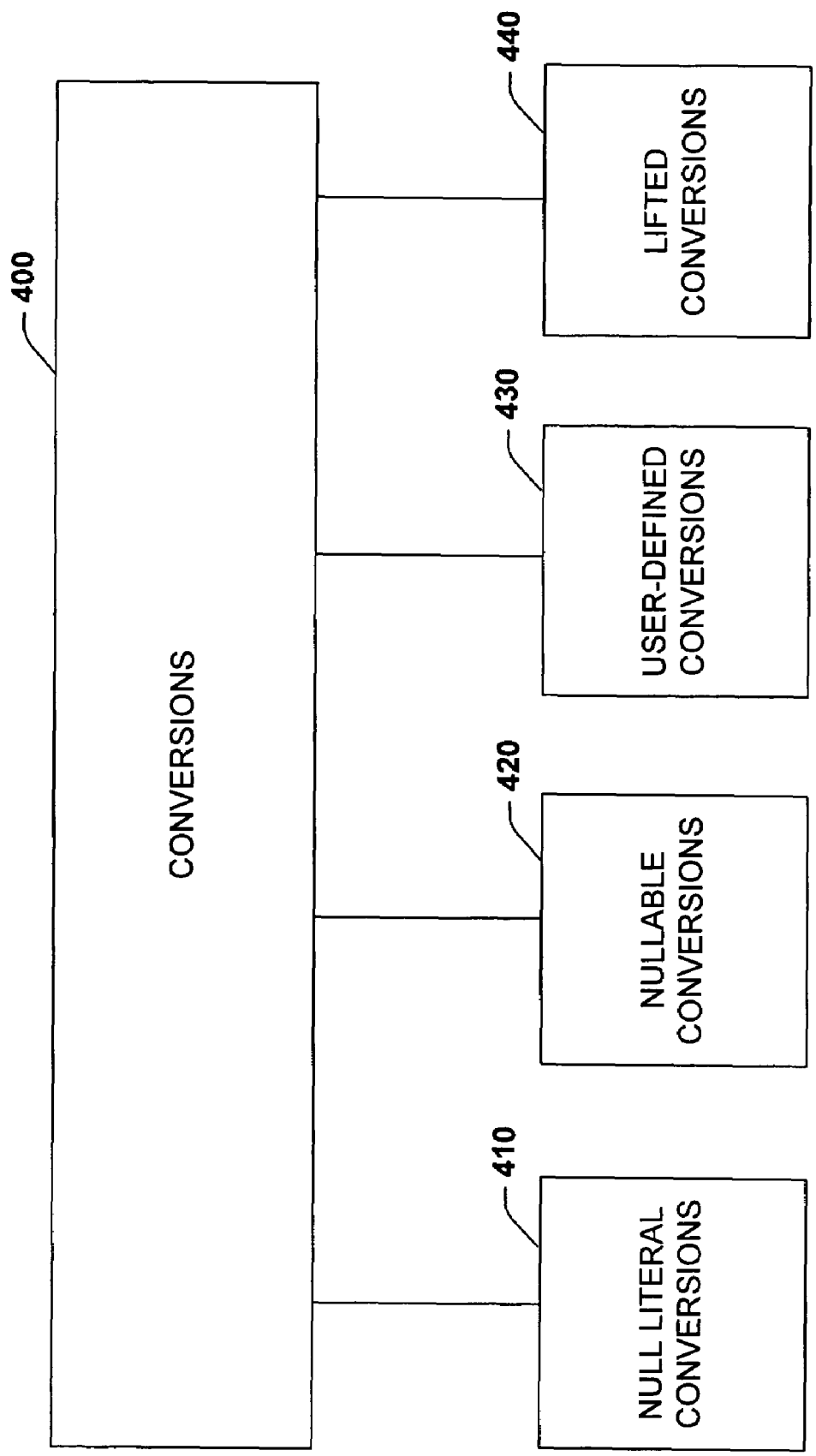
FIG. 4 illustrates nullable type conversions in accordance with an aspect of the present invention.

Referring now to FIG. 4, nullable type conversions 400 are illustrated in accordance with an aspect of the subject invention. Before proceeding, the following notations and terms are used: The term wrapping denotes the process of packaging a value, of type T, in an instance of a type of the form T?. Conceptually, a value x of type T is wrapped to type T? by evaluating the expression new T?(x). The term unwrapping denotes the process of obtaining the value, of type T, contained in an instance of a type of the form T?. Conceptually, a value x of type T? is unwrapped to type T by evaluating the expression x.Value. Attempting to unwrap a null instance causes a System.InvalidOperationException to be thrown.

At 410, null literal conversions are considered. An implicit conversion exists from the null literal to any nullable type. This conversion produces the null value of the given nullable type. At 420, nullable conversions are considered. Nullable conversions permit predefined conversions that operate on non-nullable value types to also be used with nullable forms of those types. For each of the predefined implicit or explicit conversions that convert from a non-nullable value type S to a non-nullable value type T, the following nullable conversions exist: An implicit or explicit conversion from types of the form S? to types of the form T?, an implicit or explicit conversion from S to types of the form T?, or an explicit conversion from types of the form S? to T.

A nullable conversion is itself classified as an implicit or explicit conversion. Implicit nullable conversions are classified as standard implicit conversions and can thus occur as part of a user-defined conversion. Evaluation of a nullable conversion based on an underlying conversion from S to T proceeds as follows: If the nullable conversion is from a type of the form S? to a type of the form T?: If the source value is null (HasValue property is false), the result is the null value of type T?. Otherwise, the conversion is evaluated as an unwrapping from S? to S, followed by the underlying conversion from S to T, followed by a wrapping from T to T?. If the nullable conversion is from S to a type of the form T?, the conversion is evaluated as the underlying conversion from S to T followed by a wrapping from T to T?. If the nullable conversion is from a type of the form S? to T, the conversion is evaluated as an unwrapping from S? to S followed by the underlying conversion from S to T.

At 430, user-defined conversions are considered. The rules governing permitted user-defined conversion operator declarations are modified to allow a struct to also declare conversion operators that convert to or from nullable forms of the struct type. A class or struct is permitted to declare a conversion from a source type S to a target type T only if all of the following are true, where $S_0$ and $T_0$ are the types that result from removing all trailing ? modifiers (if any) from S and T:

A. $S_0$ and $T_0$ are different types.
B. Either $S_0$ or $T_0$ is the class or struct type in which the operator declaration takes place.
C. Neither $S_0$ nor $T_0$ is an interface-type.
D. Excluding user-defined conversions, a conversion does not exist from S to T or from T to S.

Evaluation of user-defined conversions is modified as follows to support nullable types: Trailing ? modifiers (if any) are removed from the source and target types before determining the set of types from which user-defined conversion operators will be considered. For example, when converting from a type S? to a type T?, the set of types from which user-defined conversion operators will be considered consists of S and T. When the source and target types are both nullable, the set of applicable conversion operators includes not just user-defined conversion operators but also lifted conversion operators. When determining the most specific conversion operator, user-defined conversion operators are preferred over lifted conversion operators.

At 440, lifted conversions are considered. Given a user-defined conversion operator that converts from a non-nullable value type S to a non-nullable value type T, a lifted conversion operator exists that converts from S? to T?. This lifted conversion operator performs an unwrapping from S? to S followed by the user-defined conversion from S to T followed by a wrapping from T to T?, except that a null valued S? converts directly to a null valued T?. A lifted conversion operator has the same implicit or explicit classification as its underlying user-defined conversion operator.

Figure 5:
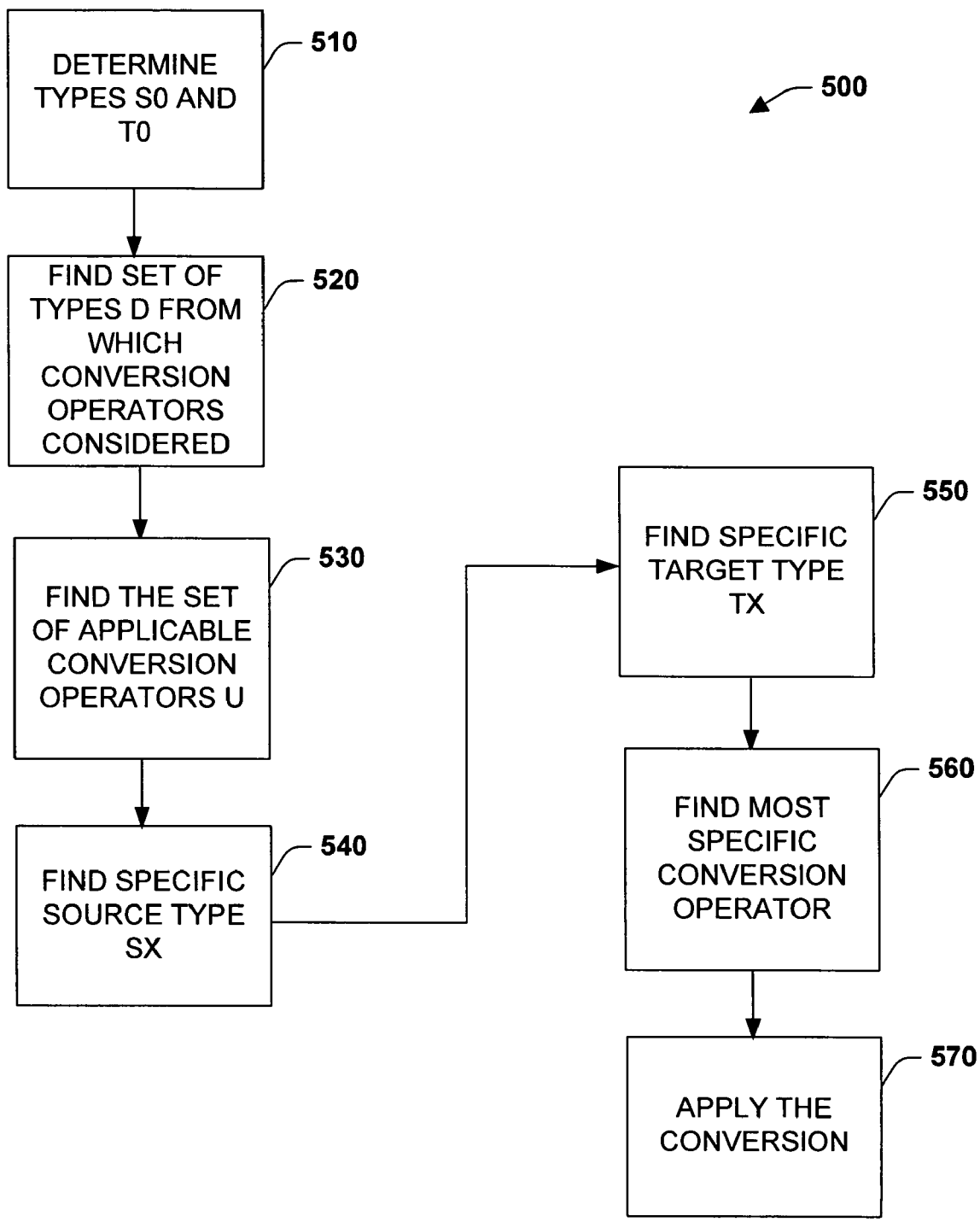
FIG. 5 illustrates an example conversion process in accordance with an aspect of the present invention.

FIG. 5 illustrates a process 500 for handling implicit and explicit conversions in accordance with an aspect of the subject invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Before proceeding, it is noted that implicit and explicit conversions are described that generally follow the flow diagram 500. A user-defined implicit conversion from type S to type T is processed as follows: At 510, determine the types $S_0$ and $T_0$ that result from removing all trailing ? modifiers (if any) from S and T. At 520, find the set of types, D, from which user-defined conversion operators will be considered. This set consists of $S_0$ (if $S_0$ is a class or struct), the base classes of $S_0$ (if $S_0$ is a class), and $T_0$ (if $T_o$ is a class or struct). At 530, find the set of applicable conversion operators, U. This set consists of the user-defined and, if S and T are both nullable, lifted implicit conversion operators declared by the classes or structs in D that convert from a type encompassing S to a type encompassed by T. If U is empty, the conversion is undefined and a compile-time error occurs.

At 540, find the most specific source type, $S_x$, of the operators in U: If any of the operators in U convert from S, then $S_x$ is S. Otherwise, $S_x$ is the most encompassed type in the combined set of source types of the operators in U. If exactly one most encompassed type cannot be found, then the conversion is ambiguous and a compile-time error occurs. At 550, find the most specific target type, $T_x$, of the operators in U: If any of the operators in U convert to T, then $T_x$ is T. Otherwise, $T_x$ is the most encompassing type in the combined set of target types of the operators in U. If exactly one most encompassing type cannot be found, then the conversion is ambiguous and a compile-time error occurs. At 560, find the most specific conversion operator: If U contains exactly one user-defined conversion operator that converts from $S_x$ to $T_x$, then this is the most specific conversion operator. Otherwise, if U contains exactly one lifted conversion operator that converts from $S_x$ to $T_x$, then this is the most specific conversion operator. Otherwise, the conversion is ambiguous and a compile-time error occurs. At 570, apply the conversion: If S is not $S_x$, then a standard implicit conversion from S to $S_x$ is performed. The most specific conversion operator is invoked to convert from $S_x$ to $T_x$. If $T_x$ is not T, then a standard implicit conversion from $T_x$ to T is performed.

Before proceeding, a process for user-defined explicit conversions is described that generally follows the flow of FIG. 5. A user-defined explicit conversion from type S to type T is processed as follows: Determine the types $S_0$ and $T_0$ that result from removing all trailing ? modifiers (if any) from S and T. Find the set of types, D, from which user-defined conversion operators will be considered. This set consists of $S_0$ (if $S_0$ is a class or struct), the base classes of $S_0$ (if $S_0$ is a class), $T_0$ (if $T_0$ is a class or struct), and the base classes of $T_0$ (if $T_0$ is a class). Find the set of applicable conversion operators, U. This set consists of the user-defined and, if S and T are both nullable, lifted implicit or explicit conversion operators declared by the classes or structs in D that convert from a type encompassing or encompassed by S to a type encompassing or encompassed by T. If U is empty, the conversion is undefined and a compile-time error occurs.

Find the most specific source type, $S_x$, of the operators in U: If any of the operators in U convert from S, then $S_x$ is S. Otherwise, if any of the operators in U convert from types that encompass S, then $S_x$ is the most encompassed type in the combined set of source types of those operators. If exactly one most encompassed type cannot be found, then the conversion is ambiguous and a compile-time error occurs.

Otherwise, $S_x$ is the most encompassing type in the combined set of source types of the operators in U. If exactly one most encompassing type cannot be found, then the conversion is ambiguous and a compile-time error occurs. Find the most specific target type, $T_x$, of the operators in U: If any of the operators in U convert to T, then $T_x$ is T.

Otherwise, if any of the operators in U convert to types that are encompassed by T, then $T_x$ is the most encompassing type in the combined set of target types of those operators. If exactly one most encompassing type cannot be found, then the conversion is ambiguous and a compile-time error occurs. Otherwise, $T_x$ is the most encompassed type in the combined set of target types of the operators in U. If exactly one most encompassed type cannot be found, then the conversion is ambiguous and a compile-time error occurs.

Find the most specific conversion operator: If U contains exactly one user-defined conversion operator that converts from $S_x$ to $T_x$, then this is the most specific conversion operator. Otherwise, if U contains exactly one lifted conversion operator that converts from $S_x$ to $T_x$, then this is the most specific conversion operator. Otherwise, the conversion is ambiguous and a compile-time error occurs. Apply the conversion:

If S is not $S_x$, then a standard explicit conversion from S to $S_x$ is performed. The most specific conversion operator is invoked to convert from $S_x$ to $T_x$. If $T_x$ is not T, then a standard explicit conversion from $T_x$ to T is performed.

Figure 6:
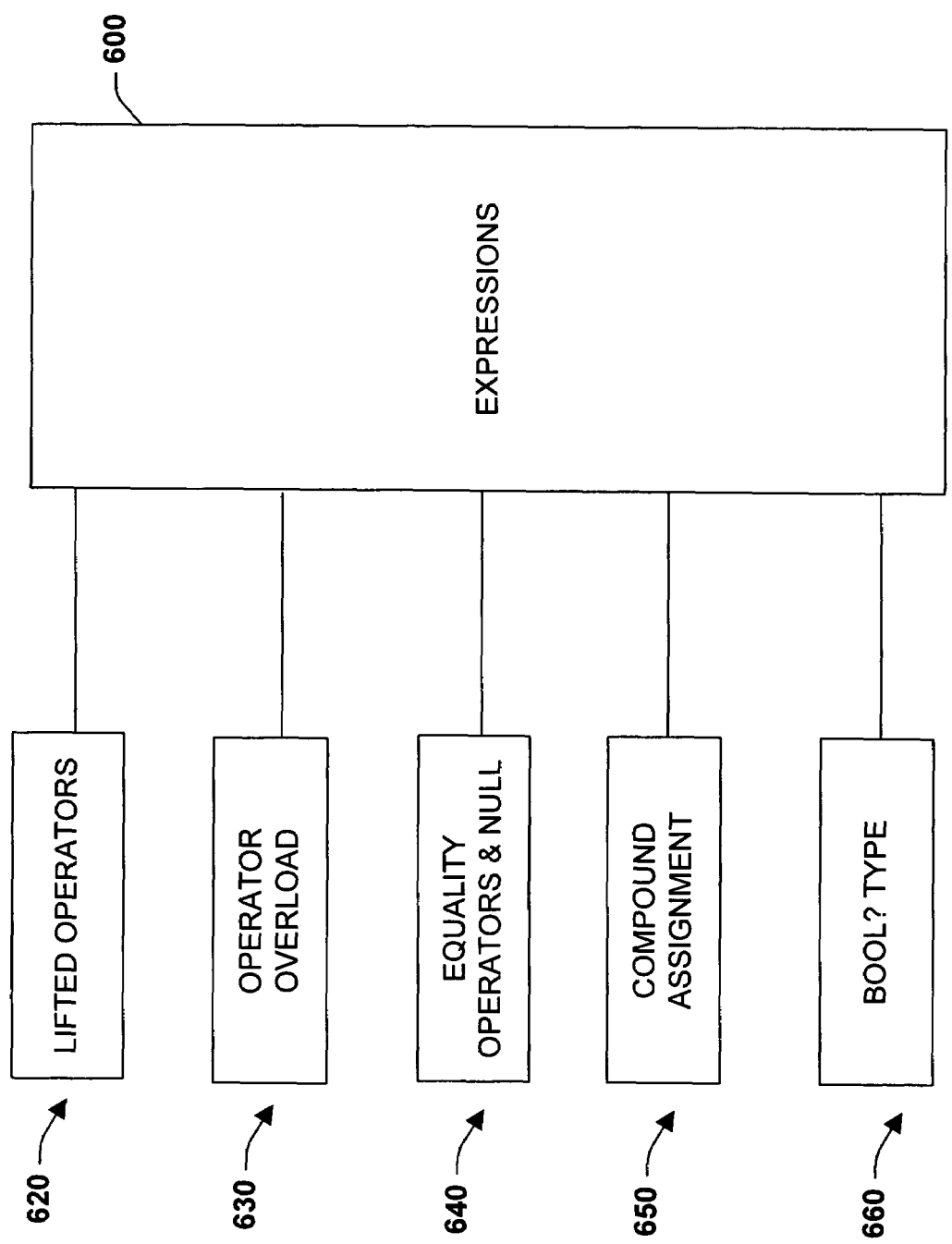
FIG. 6 illustrates example expressions associated with nullable types in accordance with an aspect of the subject invention.

FIG. 6 illustrates example expressions 600 associated with nullable types in accordance with an aspect of the subject invention. At 610, Lifted operators permit predefined and user-defined operators that operate on non-nullable value types to also be used with nullable forms of those types. Lifted operators are constructed from predefined and user-defined operators that meet certain requirements, as described in the following:

For the unary operators + ++ - -- ! ~ a lifted form of an operator exists if the operand and result types are both non-nullable value types. The lifted form is constructed by adding a single ? modifier to the operand and result types. The lifted operator produces a null value if the operand is null. Otherwise, the lifted operator unwraps the operand, applies the underlying operator, and wraps the result.

For the binary operators + - * / % & |ˆ << >> a lifted form of an operator exists if the operand and result types are all non-nullable value types. The lifted form is constructed by adding a single ? modifier to each operand and result type. The lifted operator produces a null value if one or both operands are null (an exception being the & and | operators of the bool? type described below). Otherwise, the lifted operator unwraps the operands, applies the underlying operator, and wraps the result.

For the equality operators == != a lifted form of an operator exists if the operand types are both non-nullable value types and if the result type is book. The lifted form is constructed by adding a single ? modifier to each operand type. The lifted operator considers two null values equal, and a null value unequal to any non-null value. If both operands are non-null, the lifted operator unwraps the operands and applies the underlying operator to produce the bool result.

For the relational operators < > <= >= a lifted form of an operator exists if the operand types are both non-nullable value types and if the result type is bool. The lifted form is constructed by adding a single ? modifier to each operand type. The lifted operator produces the value false if one or both operands are null. Otherwise, the lifted operator unwraps the operands and applies the underlying operator to produce the bool result.

At 620, operator overload resolution is considered. The rules for unary and binary operator overload resolution can be modified as follows to support lifted operators: Trailing ? modifiers (if any) are removed from the operand types to determine the types in which to locate user-defined operator declarations. For example, if the operands are of type X? and Y?, the set of candidate operators is determined by examining X and Y. When determining the set of candidate user-defined operators, lifted forms of the operators declared in a type are considered to also be declared by the type.

Operator lifting applies to predefined operators, and the lifted forms of the predefined operators are themselves considered predefined operators. When selecting the single best operator, if two operators have identical signatures, an unlifted operator is generally considered more optimal than a lifted operator.

At 640, equality operators and null is considered. The == and != operators permit one operand to be a value of a nullable type and the other to be the null literal, even if no predefined or user-defined operator (in unlifted or lifted form) exists for the operation.

For an operation of one of the forms x==null null==x x !=null null !=x where x is an expression of a nullable type, if operator overload resolution fails to find an applicable operator, the result is instead computed from the HasValue property of x. Specifically, the first two forms are translated into !x.HasValue, and last two forms are translated into x.HasValue. At 650, compound assignments are considered. Compound assignment operations support lifted operators. Since a compound assignment x op=y is evaluated as either x=x op y or x=(T)(x op y), the existing rules of evaluation implicitly cover lifted operators and thus no changes to the rules are required.

At 660, a bool? Type is considered. The nullable boolean type bool? can represent three values, true, false, and null, and is conceptually similar to the three-valued type used for boolean expressions in SQL. To ensure that the results produced by the & and | operators for bool? operands are consistent with SQL's three-valued logic, the following predefined operators are provided: bool? operator &(bool? x, bool? y);

and bool? operator |(bool? x, bool? y); The following table lists the results produced by these operators for all combinations of the values true, false, and null.

| x | y | x & y | x \| y |
|---|---|---|---|
| true | true | True | True |
| true | false | False | True |
| true | null | Null | True |
| false | true | False | True |
| false | false | False | False |
| false | null | False | Null |
| null | true | Null | True |
| null | false | False | Null |
| null | null | Null | Null |

The bool? type is considered to implement operator true and operator false in the obvious manner: operator true returns true if the operand is true, and operator false returns true if the operand is false. Since bool? implements these operators, operands of the ?? and || operators are permitted to be of type bool?, and expressions of type bool? may be used with if, while, do, and for statements.

Figure 7:
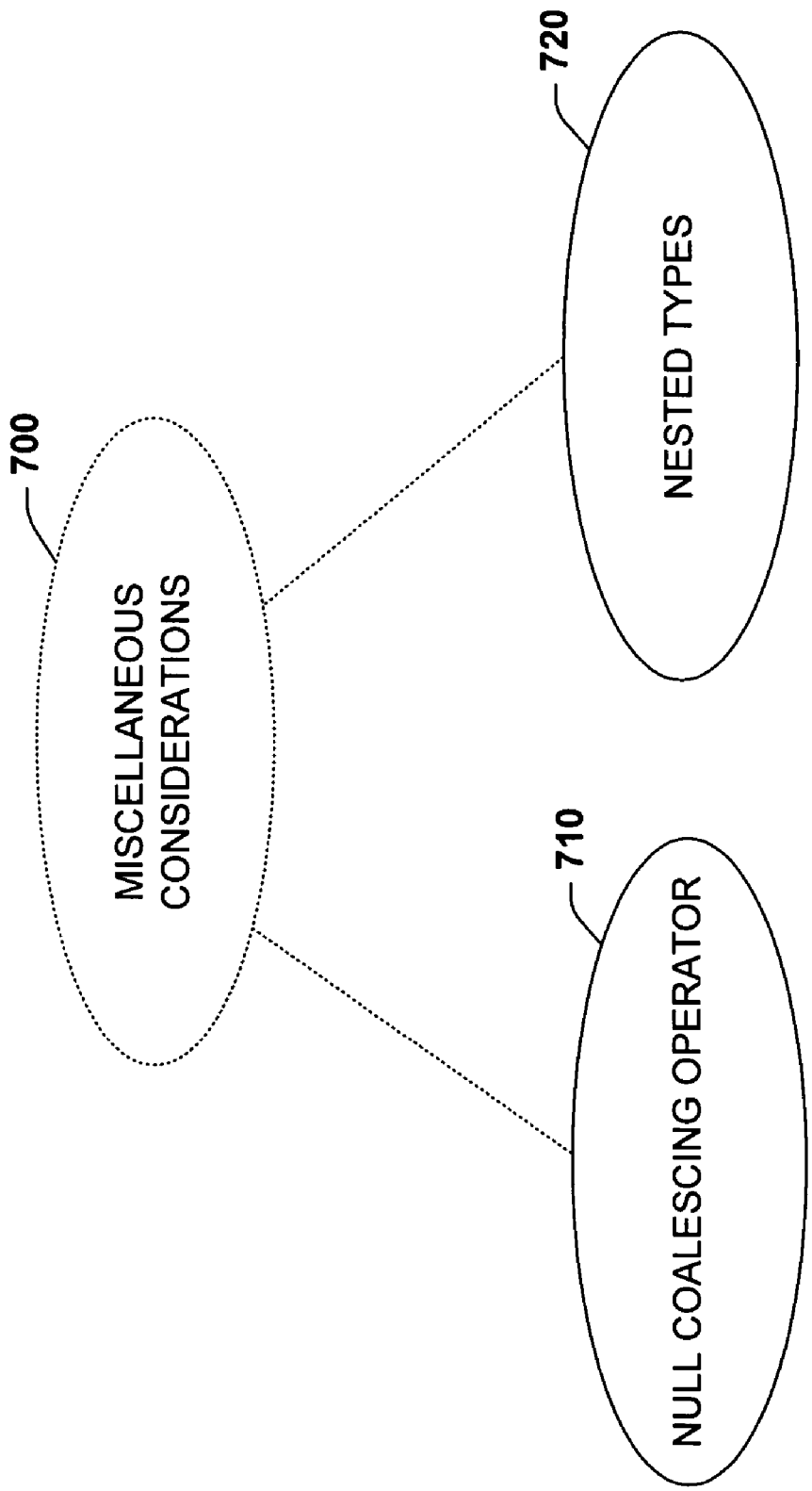
FIG. 7 illustrates miscellaneous considerations for nullable types in accordance with an aspect of the subject invention.

FIG. 7 illustrates miscellaneous considerations 700 nullable types in accordance with an aspect of the subject invention. At 710, a null coalescing operator is considered.

A?? operator is referred to as a null coalescing operator.

```
null-coalescing-expression:
    conditional-or-expression
    conditional-or-expression double-question null-
        coalescing-expression
double-question:
    ? ?
conditional-expression:
    null-coalescing-expression
    null-coalescing-expression ? expression : expression
```

The double-question production does not permit any intervening whitespace or comments between the two ? tokens. A null coalescing expression of the form a ?? b requires a to be of a nullable type or reference type. If a is non-null, the result of a ?? b is a; otherwise, the result is b. The operation evaluates b only if a is null.

The null coalescing operator is right-associative, meaning that operations are grouped from right to left. For example, an expression of the form a ?? b ?? c is evaluated as a ?? (b ?? c). In general terms, an expression of the form $E_1$ ?? $E_2$ ?? ... ?? $E_N$ returns the first of the operands that is non-null, or null if all operands are null. The type of the expression a ?? b depends on which implicit conversions are available between the types of the operands. In order of preference, the type of a ?? b is $A_0$, A, or B, where A is the type of a, B is the type of b, and $A_0$ is the type that results from removing all trailing ? modifiers from A. Specifically, a ?? b is generally processed as follows: If A is not a nullable type or a reference type, a compile-time error occurs. If A is a nullable type and an implicit conversion exists from b to $A_0$, the result type is $A_0$. At run-time, a is first evaluated. If a is not null, a is unwrapped to type $A_0$, and this becomes the result. Otherwise, b is evaluated and converted to type $A_0$, and this becomes the result. Otherwise, if an implicit conversion exists from b to A, the result type is A. At run-time, a is first evaluated. If a is not null, a becomes the result. Otherwise, b is evaluated and converted to type A, and this becomes the result. Otherwise, if an implicit conversion exists from $A_0$ to B, the result type is B. At run-time, a is first evaluated. If a is not null, a is unwrapped to type $A_0$ (unless A and $A_0$ are the same type) and converted to type B, and this becomes the result. Otherwise, b is evaluated and becomes the result. Otherwise, a and b are incompatible, and a compile-time error occurs.

At 720, nested types are considered. In one aspect, the type-system described above can prevent users from constructing type T? when T is a reference type or T itself is S? for some type S at compile time. The underlying implementation uses the existing "struct" constraint to encode this. As a result, users are not allowed by design to write string? since string is a reference type, or int?? since int? is a nullable type. One concept is that the type-system can impose certain constraints on the construction of nullable types if desired; the current constraint is a specific instance of this concept. For example, in the future it may be desirable to prevent double? Or restrict T? to types T whose size is smaller than 10 bytes or other constraint.

In another example, consider nested type T?? at runtime. Assume that that there are two operations on T? namely HasValue that tests if a value t of type T? is null, and Value that given a value of type T? returns the underlying value of type T. Consider the following example:
    int? x=null;
    int?? y=x;

It should be clear that x.HasValue returns false. One question is what y.HasValue should return. In principle it could return true, since x is actually a value of type int?. It would be unusual however if y.HasValue returns true while y.Value.HasValue returned false (since y.Value is x, and x.HasValue is false). The purpose of "null unification" or null-propagation is to make sure that for any value r if r.HasValue is true then r.Value.HasValue is true as well (or if r.Value.HasValue is false, then r.HasValue is false as well). There are several ways to achieve the above: (a) perform a check in the constructor of T? and propagate the underlying null (b) to insert special unification code at certain points in the program where nested nullable values are constructed, or (c) to throw an error in the static constructor of the Nullable<T> when T itself is Nullable. The general concepts ensures the runtime invariant that for any value r of type T? if P(r) is true then P(r.Value) is true as well for some predicate P. In case nested nullable types or nullable reference types are allowed, the given rules for the systems and methods described above can be generalized.

Figure 8:
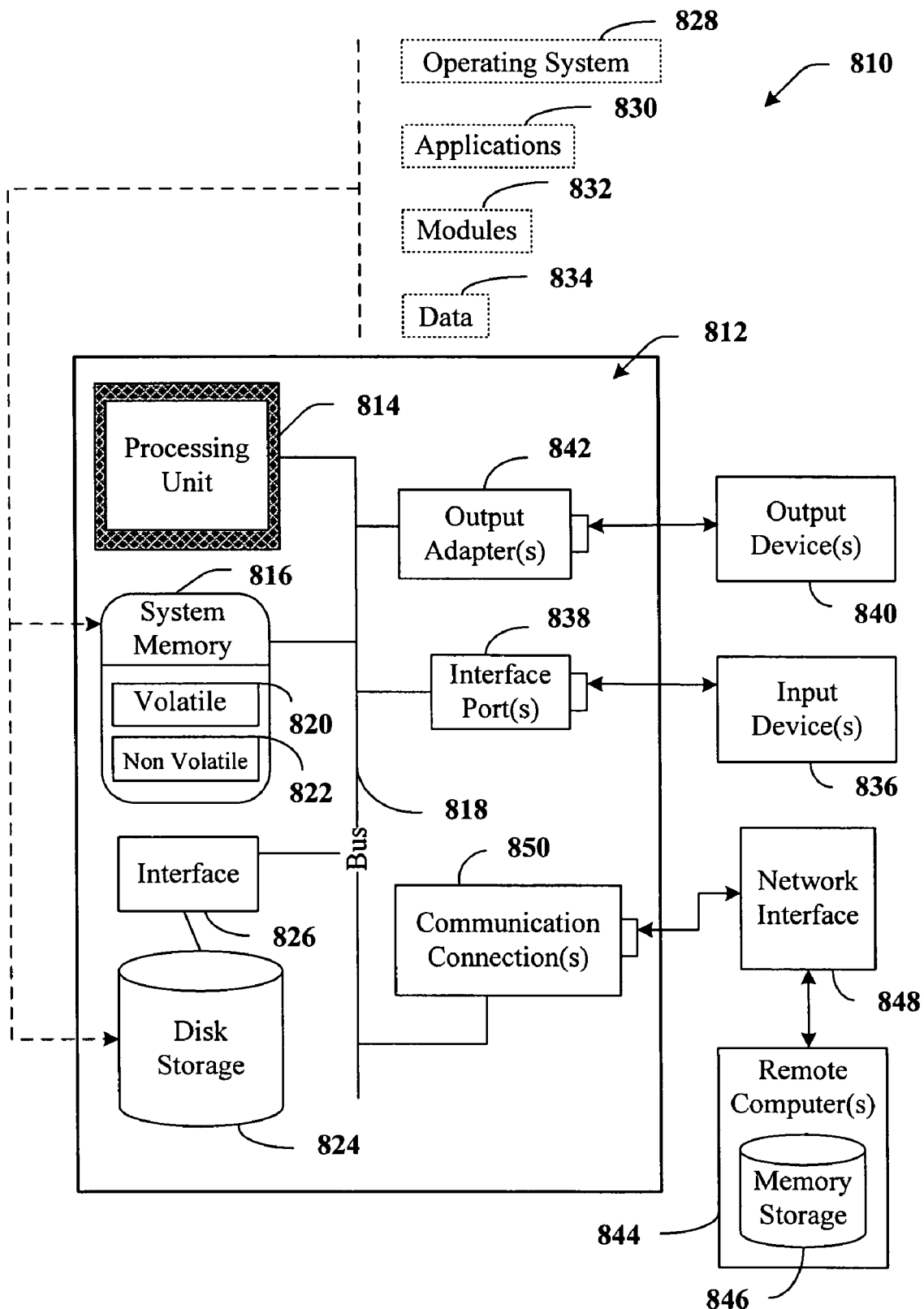
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
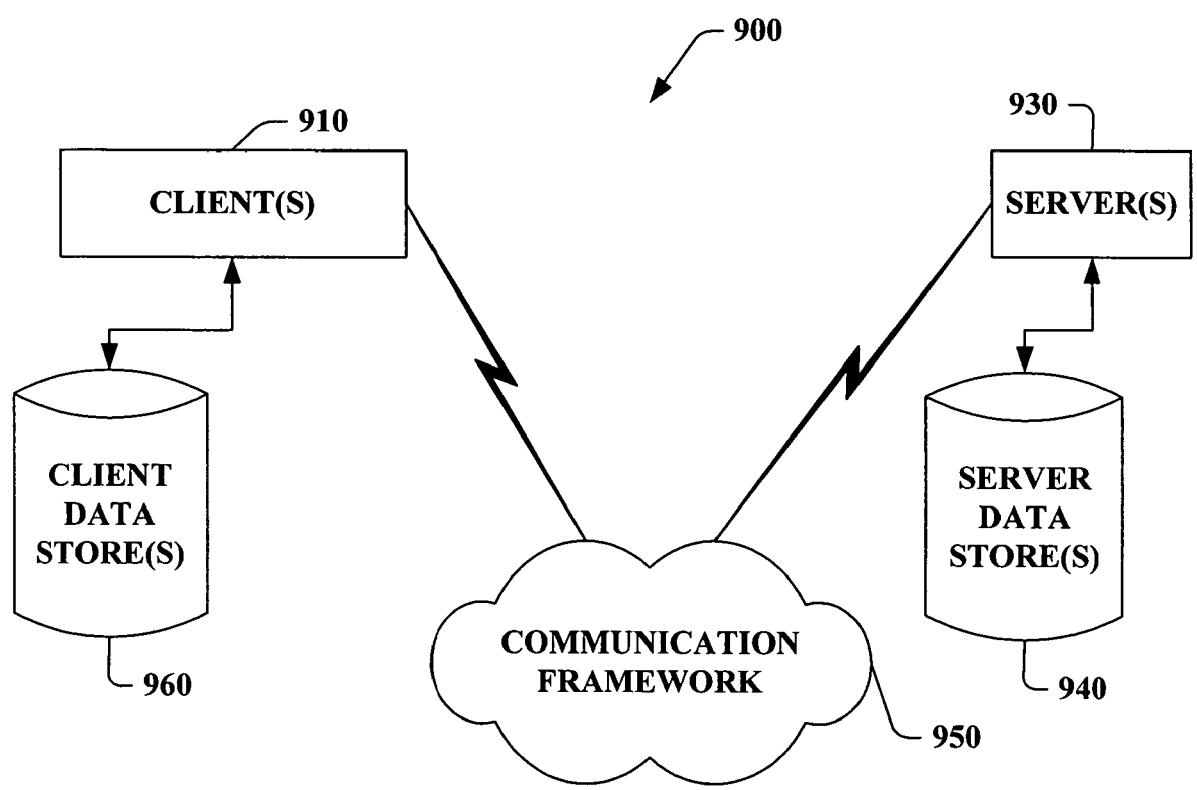
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates null-support in programming languages, comprising:
   a computer processor for executing the following software components,
   at least one type associated with at least one programming language; and
   a type modifier to signal that the type is nullable, the type modifier enables a multi-element structure to be created in association with the type, the multi-element structure includes an original value, and a Boolean element for whether or not a variable is null, wherein the nullable type is associated with a nested type to construct a nested nullable type, and the nested nullable type is associated with a constraint for limiting operations of types, the constraint is associated with throwing an error in a static constructor of a nullable type <T> when T is nullable, and wherein the nested nullable type is associated with an arbitrary constraint for limiting operations of types;

wherein the constraint is associated with performing a check in a constructor of a nullable type and propagating an underlying null, and inserting a unification code at points in a program where nested nullable values are constructed;

wherein the type modifier creates a structure that combines a value of an underlying type with a Boolean null indicator, and wherein the nullable type is associated with an operator and is a nullable Boolean type that represents three values, true, false and null, such that the nullable Boolean type produces the three-valued type used for Boolean expressions in Structured Query Language (SQL).

2. The system of claim 1, the multi-element structure includes an original value and an indicator value for whether or not the variable is null.

3. The system of claim 1, the programming language includes at least one of C, C++, C#, Perl, Python, Ruby, Visual Basic, and JAVA.

4. The system of claim 1, the type modifier creates a structure that combines a value of an underlying type with an indicator value.

5. The system of claim 1, further comprising at least one instance of a nullable type having two public properties: HasValue, of type bool, and Value, of the nullable type's underlying type, wherein HasValue is true for a non-null instance and false for a null instance.

6. The system of claim 5, when HasValue is true, the Value returns the contained value and when HasValue is false, an attempt to access the Value property throws an exception.

7. The system of claim 1, further comprising at least one instance of a nullable type having public properties or methods to check for nullness of a value and to extract an underlying value.

8. The system of claim 1, the nullable type is associated with an implicit or an explicit conversion.

9. The system of claim 1, the nullable type is associated with a lifted conversion.

10. The system of claim 1, the nullable type is associated with a user-defined conversion.

11. The system of claim 1, the nullable type is associated with at least one of a compound assignment, a literal conversion, and a nullable conversion.

12. The system of claim 1, the nullable type is associated with a null coalescing operator.

13. The system of claim 1, the nullable type is employed to facilitate an interface between at least one programming language and a null-supported language.

14. The system of claim 13, the null-supported language is at least one of SQL, and Extensible Markup Language (XML).

15. A computer readable medium having computer readable instructions stored thereon for implementing the components of claim 1.

16. A computer-implemented system for providing generalized nullable type support in a programming language, comprising:
a computer processor for executing the following software components,
means for indicating that a programming language type is a nullable type; and
means for creating a structure having at least two elements associated with the nullable type, the structure includes a value associated with the nullable type and a Boolean value indicating whether the nullable type is null, and
wherein the nullable type is associated with an operator and is a nullable Boolean type that represents three values, true, false and null, such that the nullable Boolean type produces the three-valued type used for Boolean expressions in SQL, and
wherein the nullable type is associated with a nested type to construct a nested nullable type that is associated with a constraint for limiting operations of types, the constraint is associated with throwing an error in a static constructor of a nullable type <T> when T is nullable.

17. A method that facilitates nullable type functionality in a programming language, comprising:
employing a processor to execute computer executable instructions stored on a computer readable medium to perform the following acts:
marking a programming language type as a nullable type;
automatically creating a structure for the nullable type, the structure having a Boolean value indicating a null or a non-null value and an element representing a value for the programming language type; and
associating the nullable type with a nested type to construct a nested nullable type that is associated with a constraint for limiting operations of types, the constraint is associated with throwing an error in a static constructor of a nullable type <T> when T is nullable;
wherein the nullable type is associated with an operator and is a nullable Boolean type that represents three values, true, false and null, such that the nullable Boolean type produces the three-valued type used for Boolean expressions in SQL.

18. The method of claim 17, further comprising interfacing the programming language type with a null-supported programming language.

19. The method of claim 17, the nullable type is associated with at least one of a lifting operation, an overload operation, an equality operation, a compound assignment operation, and a null coalescing operation.

20. The method of claim 17, the nullable type is associated with at least one of an implicit conversion, an explicit conversion, a literal conversion, a nullable conversion, and a user-defined conversion.

* * * * *